Jan. 12, 1954 C. W. SWAN 2,665,799

DELAY MECHANISM FOR TAPE CONTROLLED APPARATUS

Filed Sept. 12, 1950

INVENTOR
CARL W. SWAN
BY Emery Robinson
ATTORNEY

Patented Jan. 12, 1954

2,665,799

UNITED STATES PATENT OFFICE 2,665,799

DELAY MECHANISM FOR TAPE CONTROLLED APPARATUS

Carl W. Swan, Skokie, Ill., assignor, by mesne assignments, to Teletypesetter Corporation, Chicago, Ill., a corporation of Delaware Application September 12, 1950, Serial No. 184,409

11 Claims. (Cl. 199—18)

Figures 1, 2, 3:
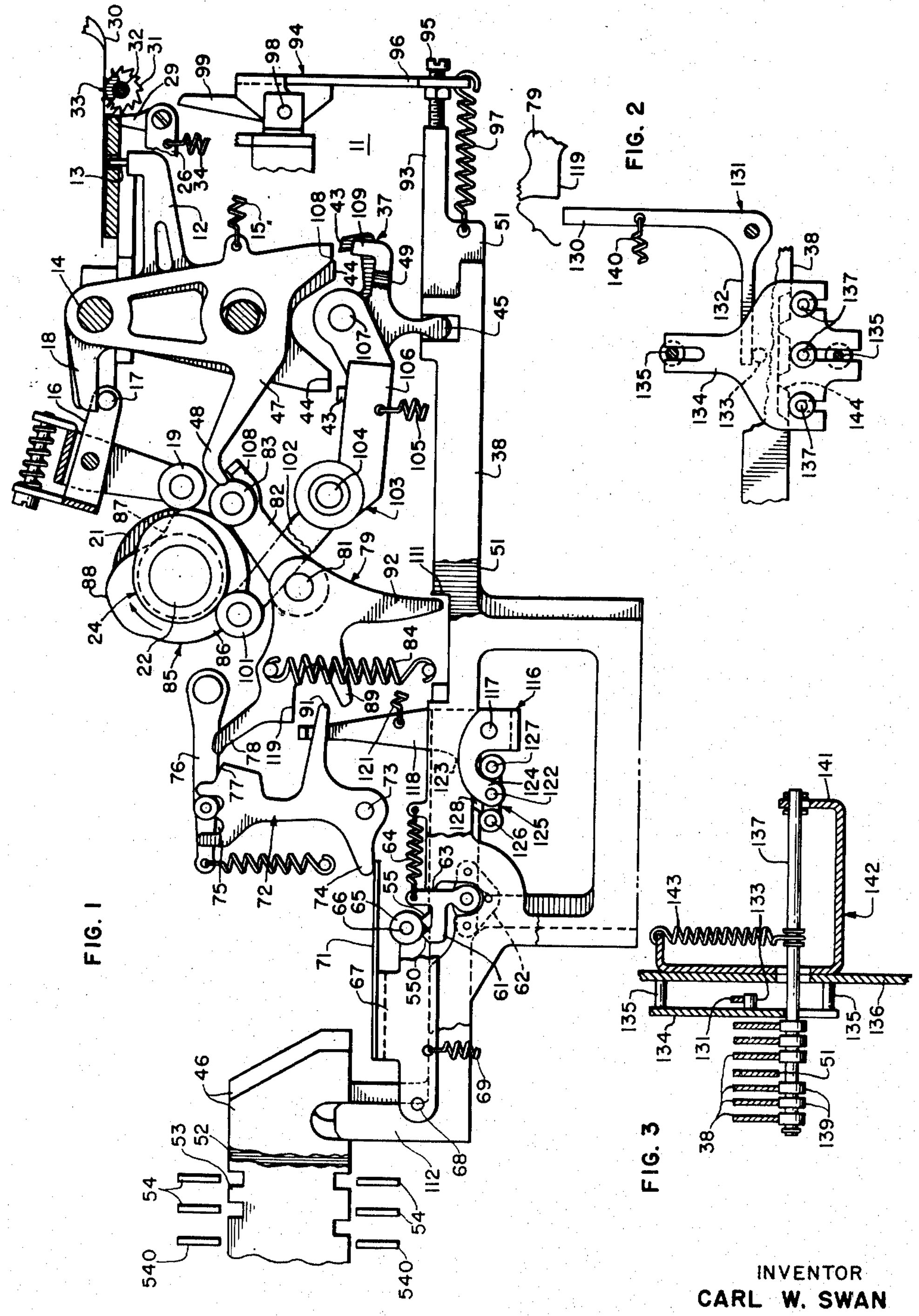

This invention relates to control devices for linecasting and composing machines and more particularly to signal controlled mechanism for controlling the automatic operation and supervision thereof.

In achieving automatic control of present commercial types of linecasting and composing machines it has been observed that the speed of operation which is attainable by the signal sensing and mechanical selecting mechanism exceeds that at which the linecasting machine is capable of responding. Accordingly, devices have been perfected which serve to introduce a time lag or delay factor into the operation of the automatic control mechanism so that there may result an adjustment in certain instances where the speeds of the two devices are at variance. U. S. Patents Nos. 2,062,332, 2,090,654, and 2,104,030, disclose examples of mechanisms designed to obtain a co-ordination between automatic control devices and the principal linecasting and composing machines.

Where in ordinary composition, various character matrices are released alternatively and in irregular succession, a given matrix release device has sufficient time to restore itself to normal condition so that it may be in readiness for a succeeding operation, though in so doing it requires a somewhat longer period to complete its function cycle than that period which is required by an operating unit to complete its initiating cycle. Where a given signal is repeated one or more times, it has been observed that the occurrence of the succeeding consecutive initiating stroke is in advance of the corresponding operating cycle of the principal machine that its associated matrix release device is incapable of arriving at its normal position in sufficient time to respond thereto.

The principal object of the present invention is to provide an apparatus responsive to consecutively repeated characters for introducing automatically a time delay in the operation of the control unit and thereby adjusting the inherent speed thereof with that of its associated linecasting machine.

Another object of the invention is to provide means for negativing the effect of the time delay means in response to certain predetermined signals.

To achieve the foregoing objects and purposes of the invention there is contemplated in accordance with the present invention, a record reader mechanism including a set of tape sensing feeler levers and having associated with it a selectable device conditioned by consecutive ones of a series of identical character signals and effective to arrest momentarily the continued operation of the record reader mechanism. As a result of such selection, there is permitted the intervention of a time delay factor which not only blocks the selection and actuation of the particular selectable element whose code signal has become manifest but also arrests the reciprocatory tape feeding action, resulting in the retention of the tape in its previous position to sense the same code signal twice, so that upon the subsequent operation the ensuing code signal may be transmitted immediately to the selector mechanism.

After a pause which is equivalent to one cycle of operation of the record reader mechanism, the repeat signal selection device is restored to normalcy to await the occurrence of another plurality of identical code signals appearing in consecutive succession. If a plurality of identical signals (three or more) appear in the tape consecutively, the time delay factor is introduced alternatively, so that there occurs a tape arresting cycle and a tape stepping cycle alternatively. In other words, during the reading or sensing of repeated code signals, each code signal combination in the tape is sensed twice.

For a better understanding of the present invention, reference may be had to the following description taken in conjunction with the accompanying drawing, wherein:

Fig. 1 is a longitudinal sectional view of a record reader mechanism having embodied therein principles representative of the present invention, and Figs. 2 and 3 are fragmental views, showing a modified form of device for suppressing operation of the time delay mechanism under certain predetermined operative conditions.

The present invention, in its preferred embodiment, has been adapted to an automatic control mechanism exemplified by U. S. Patent No. 2,091,286. A record reader mechanism is indicated by the reference character 11, which consists briefly of a set of feeler levers or tape sensers 12, each provided with a feeler pin 13 and pivoted on a common shaft 14. The perforated tape or control form is previously prepared in a perforating machine where it receives permutatively variant transverse rows of holes. Where the tape is employed in the control of linecasting machines, each row relates to a line composition character, or to a functional operation of the composing machine as distinguished from matrix release or selection. Each row may be said to comprise the area, transversely, in which a basic number of perforations may occur permutably. Because the presence or absence of a perforation is controlled by perforating mechanism which may be electrically supervised, these indications will be referred to according to telegraph terminology as marking and spacing signal elements respectively. For convenience in describing the sensing and transfer mechanisms of the record reader mechanism in its alternative positions corresponding terminology will be employed hereinafter.

Individual springs 15 (Fig. 1) tend normally to maintain the feeler levers 12 in their extreme counterclockwise position and in this they are cyclically opposed by the action of a reciprocating bail 16 which is comprised of a transversely extending rod 17 traversing beneath the horizontal extensions 18 integrally formed with the feeler levers 12. The reciprocating bail 16 is pivotally supported at an intermediate point thereof and includes a depending portion which carries a follower roller 19 spring urged against the periphery of a feeler lever operating cam 21. The latter is carried upon a shaft 22 which is driven through a clutch from a suitable source of power. In addition to cam 21, shaft 22 also carries a tape feed cam (not shown) and a cam 24 which serves to reciprocate periodically a set of transfer T-levers 37 as described hereinafter.

During its cycle of rotation, the tape feed cam (not shown) imparts reciprocatory movement to a follower roller carried by a tape feed lever 26. At the opposite extremity of lever 26 is pivotally carried in upright position a tape feed pawl 29. The reciprocatory movement of pawl 29 which engages the teeth of a ratchet wheel 31 imparts step-by-step motion to a tape feed shaft 32 which carries a sprocket feed wheel 33 whose pins coincide with the central row of perforations conventionally provided in control forms or tapes 30 of the class employed in connection with permutation signal operating mechanisms. A spring 34 urges lever arm 26 in a clockwise direction about its pivot. The movement of the tape feed pawl 29 upwardly does not cause the movement of the tape, but this is done by spring 34.

When the several feeler levers 12 are cyclically withdrawn by bail 16, the tape 30 is advanced a distance of one step by the pawl 29, following which bail 16 is returned, permitting the individual springs 15 to urge their associated levers 12 in a counterclockwise direction. The presence or absence of a hole in the tape determines finally the distance of angular movement of any of the levers 12, depending upon whether the feeler pins 13 pass through the tape or whether they are blocked by the tape as where an imperforated position is found. The setting of the combined set of levers 12 is thereafter communicated by an associated set of transfer T-levers 37 to a set of intermediate connector bars 38. Counterclockwise movement of transfer bail or device 103 thrusts the transfer levers 37 upwardly, causing their T-head projections 43 to encounter one or the others of the feeler lever shoulders 44. In accordance with the positions of the several levers 12, the transfer levers 37 are rocked clockwise or counterclockwise, causing their disc extensions 45 to move the connector bars or settable members 38 correspondingly.

The connector bars or settable members 38 thereby receive a setting which corresponds to the perforations in the tape during each given cycle of operation and they in turn communicate this setting to a set of notched code selector bars 46.

Intermediate the tape sensing levers 12 there is pivotally supported on shaft 14 a transfer setting lever 47 resembling somewhat the general class of levers 12, but differing therefrom in that it is not provided with a sidewardly extending arm which carries a feeler pin 13, nor is the lever 47 provided with a horizontally extending projection 18 served by the reciprocating power bail 16, but in lieu of a projection 18, this lever 47 carries an upwardly and leftwardly extending arm 48. As may be understood from the absence of a feeler pin 13, lever 47 is not positioned under the control of the presence or absence of a perforation in the tape or control form 30, but instead is positioned, as will hereinafter appear, by a selectably initiated device which is responsive to repeated character signals.

Cooperating with the transfer setting lever 47 is a transfer lever 49 similar to transfer levers 37 and a connector bar or settable member 51 resembling connector bars or settable member 38. Instead of bar 51 being articulated to a code selector bar 46, it is connected instead to a blocking bar 52, similar to blocking bar 52 shown in Fig. 1 of the aforementioned U. S. Patent No. 2,104,030. The projections or wards 53 of blocking bar 52 are distributed so as to clear each of the individually selectable pull bars 54 under normal conditions when any one of them is otherwise receivable with the code notches appearing in the general class of code bars 46, and to block the selective movement thereof during an idle cycle of rotation as will be more fully explained hereinafter.

In contradistinction to the general class of pull bars 54 there may be noted in Fig. 1 a pair of certain function performing pull bars 540, the purpose of which is explained in the aforementioned Patent No. 2,090,654. The lug or ward attributes of blocking bar 52 are designed to normally prevent or block the selective clearance of pull bars 540 while the projections 53 clear the general class of pull bars 54. Subsequently, when blocking bar 52 is shifted, either in accordance with the repeat selection bail or in accordance with a rail shift delay operation, a reversal of conditions is effected with the projections 53 blocking the general class of pull bars 54 but affording a selective clearance (in the event of a rail shift signal) to the rail shift pull bars 540.

Each of the connector bars 38 carries integrally on its upper edge a saw tooth cam projection or detent 55. A corresponding saw tooth cam projection or detent 550 associated with the special connector bar 51 is carried on a yieldable pawl member 61 pivotally carried on a pivot plate 62 secured to bar 51. Pawl 61 is normally biased clockwise against a stop 63 by a spring 64. The positions which may be assumed by the several cam projections 55 and 550 may vary, depending upon the relative position of the connector bars 38 and 51. Presented intermediate the two aforesaid positions and in the path of travel of the projections 55 and 550 are a series of anti-friction rollers 65 (one for each bar 38 and 51) carried on a shaft 66 journaled in a detent bail member 67.

Bail member 67 is supported pivotally at 68 on the main frame of the apparatus and is normally urged downwardly in detenting direction by a spring 69. The cam projections 55 and 550 in either of their rest positions may be found on one side or the other of the transversely extending roller 65, but in passing from one position to the other they engage roller 65, causing the latter to be cammed upwardly. The bail member 67 is provided with an arm 71 which is effective, when bail 67 is thus cammed upwardly, to rotate a blocking lever 72 for the purpose hereinafter described.

The pawl 61 is pivotally supported and yieldable so that it is effective to cam the bail 67 upwardly in only one direction of movement of connector bar 51. When the bar 51 is moved rightwardly (as viewed in Fig. 1), the pawl 61 yields and rotates slightly in a counterclockwise direction so that the saw tooth projection 550 rides under the roller 66, and thus the bail 67 is not cammed upwardly. Then, when the bar 51 is moved in the opposite or leftward direction, the pawl 61 bears against the stop 63 (under the influence of spring 64) and does not yield, thus causing its saw tooth portion 550 to cam the bail 67 upwardly.

The blocking member or limiter 72 is supported pivotally on a pivot stud 73 mounted in the frame and is provided with an arm 74 which cooperates with the arm 71 of the bail 67. Member 72 is also provided with a W-notched detent portion 75 adapted to cooperate with a spring actuated detent arm 76. Member 72 is provided with a shoulder 77 adapted to cooperate in blocking relation with an arm 78 of a plural-armed lever 79 mounted pivotally on a pivot shaft 81 appropriately positioned in the frame of the apparatus. Arm 82 of lever 79 carries at its extremity a cam follower roller 83. A spring 84 normally imparts counterclockwise bias to the lever 79 and causes the follower roller 83 to constantly follow the periphery of a cam 85.

Although the roller 65 of detent bail 67 embraces all of the bars 38 and 51, the arm 71 thereof cooperates only with member 72 and lever 79 which are associated only with the connector bar 51. Cam 85 is provided with a dwell 86, a low portion 87 and a high portion 88. When the roller 83 bears on the dwell 86 the arm 78 of lever 79 is held out of the path of the blocking shoulder 77. Thus, when member 72 is actuated to its clockwise position, the shoulder 77 is presented into the path of the extremity of arm 78, to thereby prevent counterclockwise actuation of lever 79. On the other hand, when member 72 is held in its counterclockwise position (as shown in Fig. 1) by the detent 76, counterclockwise actuation of lever 79 is permitted.

Lever 79 is provided with an arm 89 adapted to coact with an arm 91 on the blocking member 72. Thus, when member 72 has assumed its clockwise position to block the counterclockwise movement of lever 79, the member 72 is restored during each cycle to its counterclockwise position by arm 89 acting upon arm 91, because during each cycle of rotation of cam 85 the high portion 88 thereof imparts sufficient clockwise rotation to lever 79 to raise lever arm 89 to coact with arm 91 to swing member 72 into its counterclockwise position.

Lever 79 is also provided with a depending arm 92 which is adapted to operate bar 51 rightwardly under certain operating conditions. These conditions are established whenever lever 79 is not blocked by member 72, and lever 79 is thus permitted to rotate to its full counterclockwise position when follower roller 83 rides into the depression 87 of cam 85 under the influence of spring 84. Bar 51 is provided at its right end with an extension 93 through which it is resiliently articulated to a tape feed blocking lever 94. This pivotal articulation consists of an adjustable screw means 95 carried at the lower end of a depending arm 96 of the lever 94, and a spring 97 distended between arm 96 and bar 51 which tends to hold the means 95 against the end of bar 51.

The lever 94 is supported pivotally on a pivot 98 appropriately mounted in the frame of the apparatus. Lever 94 is also provided with an upwardly extending arm 99 which is adapted to be actuated into and out of blocking relation with the tape feed lever 26. Thus, when bar 51 is actuated rightwardly by lever 79, the lever 94 is actuated in a counterclockwise direction to bring arm 99 into blocking relation with the tape feed lever 26, thereby preventing the downward movement of pawl 29 under the influence of spring 34.

Lever 79 is further provided with an extension 100 adapted to cooperate with the arm 48 of the special selector lever 47 for the purpose of preventing interference between the selector lever 47 and its associated T-lever 49 during the transfer operation incident to repeat character operation, as will appear hereinafter.

As previously mentioned, cam 24 carried on shaft 22 operates the transfer levers 37 and 49 periodically. Therefore, cooperating with the periphery of cam 24 is a cam follower roller 101 carried on an arm 102 of a transfer bail device 103 which is rockably carried on a rock shaft 104 appropriately mounted in the frame of the apparatus. A spring 105 biases the transfer device 103 normally in a clockwise direction to hold cam follower roller 101 against the periphery of cam 24. Arm 106 of the transfer device 103 is provided at its extremity with a rock shaft 107 on which are rockably supported the aforementioned transfer T-levers 37 and 49.

In the operation of the apparatus according to the present invention it is assumed that the tape 30 contains a perforated message including occurrences of consecutively repeated character code signals. During the cyclic rotation of the cams on shaft 22, the tape feed cam (not shown) functions to rock the tape feed lever 26 to cause pawl 29 to actuate the tape stepping assembly to feed or step the tape the distance between two transverse rows of perforations. Between each stepping movement the tape is sensed or read by the sensing pins 13. In the rest position shown in Fig. 1 the cam 21 holds the bail 16 in its counterclockwise position whereat the rod 17 holds the tape feeler levers 12 in their retracted or clockwise position against the pull of their individual springs 15. The special lever 47, which has no arm 18 to cooperate with the rod 17, is normally held in its counterclockwise position by its spring 15.

During normal operation, when there are no repeat characters, the levers 12 assume their clockwise or counterclockwise position according to the presence or absence of code holes in the tape 30, and then when the transfer bail 103 is rocked in timed relation to the tape sensing or reading operation, one or the other of the abutments 43 cooperate with one or the other of the abutments 44 to rock the T-levers 37 accordingly, to thereby shift the connector bars 38 rightwardly or leftwardly depending upon whether the T-lever 37 associated therewith was rocked counterclockwise or clockwise.

It will be recalled that as the connector bars or links 38 were shifted rightwardly or leftwardly, the cam projections 55 thereon acted, through arm 71 of bail 67, to rotate the detent lever 72 to its clockwise (or rightward) position to bring the shoulder 77 into blocking relation with the arm 78 of lever 79, thereby preventing lever 79, later in the cycle, from following into the low portion 87 of cam 85. Thus, the arrestment of lever 79 permitted special lever 47 to remain in its counterclockwise position so that abutment 108 thereon could cooperate with abutment 109 of special T-lever 49 to cause, during the transfer operation, the lever 49 to be rotated clockwise to thereby shift or return (as will presently appear) the special bar 51 to its leftward position. However, since lever 79 has not yet been operated, bar 51 has not been actuated rightwardly, and accordingly T-lever 49 already is in its clockwise position. Moreover, since bar 51 has not been actuated, the lever 94 likewise has not been actuated to block the spacing operation. As previously mentioned, near the completion of the cycle just described, the apex 88 of cam 85 functions to rock lever 79 slightly clockwise to cause arm 89 to cooperate with arm 91 to return lever 72 to its leftward or counterclockwise position. During the period of operation when no repeated characters or code signal groups occur, the blocking bar 52 associated with the special bar 51 assumes its position wherein the code notches therein are presented below the selectable pull bars 54 to thereby permit their selective operation.

When consecutively repeated code signals are sensed in the tape 30, the blocking bar 52 becomes effective after the initial appearance of the repeated character in the following manner to block or prevent the selective operation of pull bars 54. During the cycle of operation of cam shaft 22, the transfer operation under the control of transfer bail 103 occurs early in the cycle immediately following the tape reading operation. The delay lever 79 is operated late in the cycle, to the effect that the bar 51 is set (shifted rightwardly) late in the first repeat cycle by the lever 79, and is returned (shifted leftwardly) early in the following cycle by the transfer device 103.

Thus, when a code signal is to be repeated, the selectors 12 are first set in accordance with the initial appearance of said repeated code signal as just described in connection with a normal operation, since in so far as the tape reader is involved, it is not yet known that a signal is to be repeated. Accordingly, at the beginning of the repeat cycle (which is the second occurrence of the character code signal being repeated) the selector or feeler levers 12 are already set according to the code perforations of the repeated character. Therefore, during the tape sensing or reading operation under the control of bail 16, the positions of the feeler levers 12 are not changed. Then, when the transfer bail 103 is operated, the positions of the T-levers 37 and 49 are likewise not changed. Because of this, no movement of bars 38 and 51, and hence cam projections 55 and 550, has occurred and as a result thereof the position of the block lever 72 has not been altered, but instead remains in the position shown in Fig. 1 so that the arm 78 of lever 79 is not blocked.

Therefore, the delay lever 79 is now permitted to follow the cam 85, so that when the follower roller 83 rides into the depression 87, the lever 79 responds to the pull of spring 84 and is rotated counterclockwise. The timing of the movements of lever 79 and bail 103 is such that the projection 108 of lever 79 encounters arm 48 of special lever 47 and moves abutment 108 out of the path of the approaching abutment 109 to prevent interference therebetween, while the arm 92 of lever 79 is effective upon shoulder 111 of special bar 51, to shift said bar 51 rightwardly.

Bar 51 in moving rightwardly actuates the special T-lever 49 to its counterclockwise position where it remains in readiness to effect, during the next ensuing cycle, the return of the bar 51 to its leftward position. Also, the bar 51 in moving rightwardly has carried with it the pawl member 61. However, the pawl tooth 550 had no effect on the bail 67 at this time because due to the yieldable construction thereof, the tooth 550 has ridden under its roller 65 to the position on the right side of the vertical center line of roller 66.

During the early part of the cycle being described, the feed pawl 29 has been elevated by the tape feed cam to its upper position preparatory to effect the stepping of the tape under the control of spring 34. However, bar 51 through its extension 93, during its shift rightwardly as just described, has imparted counterclockwise rotation to the tape feed pawl blocking lever 94 to bring arm 99 of said lever 94 beneath the end of lever 26 thereby preventing the completion of the tape feed operation.

Bar 51 has also in its rightward shifting movement caused, through articulation 112, the rightward movement of blocking bar 52 to prevent the selective operation of pull bars 54.

The control unit or apparatus according to the present invention has now been conditioned to introduce automatically a time delay factor in the operation of the control unit with respect to the controlled machine; for example, a line casting machine. When the cam shaft 22 begins its rotation for the next ensuing cycle the tape feeler levers 12 are permitted to sense or read the tape 30. However, since the tape 30 was not stepped during the last preceding cycle of operation, the pins 13 are cooperating with the same code areas in the tape as in the previous cycle. Accordingly, when the transfer bail 103 operates, no change in the setting of bars 38 will result, and thus no movement of cam projections 55 will occur. Bail 67 and block lever 72, in so far as cam projections 55 are involved will remain quiescent. However, with bar 51 still in its rightward position, the T-lever 49 is still in its counterclockwise position with its abutment 109 ready to cooperate with abutment 108 of the special lever 47. Then in the above-mentioned operation of bail 103, which is early in the cycle, it will cause abutment 109 to strike abutment 108 to impart clockwise rotation to T-lever 49, which in turn will cause the special bar 51 to move leftwardly.

As the bar 51 thus is moved leftwardly, the cam projection 550 on pawl 61 will not yield but in moving to the left side of the vertical center line of roller 65, cause bail 67 to rise and through arm 71 thereof cause the block lever 72 to assume its clockwise or rightward position to bring shoulder 77 into blocking relation with arm 78 of lever 79. Moreover, as bar 51 is thus moved leftwardly, the blocking lever 94 is rotated clockwise to remove the arm 99 from blocking relation with pawl 29. Therefore, as the cam shaft 22 continues its rotation the depression 87 of cam 88 is presented to the follower roller 83 but lever 79 being blocked at 77—78 is unable to respond to the pull of spring 84, and accordingly, bar 51 remains in its leftward position. Thus, during this time delay cycle, the bar 51 was restored to its leftward position, and the tape feed lever 26 was unblocked to permit the tape 30 to again be stepped under the pull of spring 34 to present the next row of perforations to the pins 13.

If said next row of perforations is similar to the previous row; that is, if the code signal is again repeated, then during the transfer cycle the bars 38 are not affected but remain in their set positions because the positions of the feeler levers 12 have not been changed. As a result, the block lever 72 remains in its left or counterclockwise position, and the counterclockwise movement of lever 79 by its spring 84 in timed relation to the operation of transfer bail 103 is not prevented, whereupon the bar 51 is actuated rightwardly and the lever 94 is rotated to block the tape feed lever 26. The block bar 52 is positioned to prevent the selective operation of pull bars 54. Accordingly, the next succeeding cycle is a time delay cycle wherein the code signal in the tape 30 is sensed a second time without effecting a selective operation of pull bars 54, thus permitting the operation initiated during the previous cycle to be completed. Near the completion of the instant cycle, however, the special bar 51 is restored to its leftward position and the tape feed lever 26 is unblocked, and the tape 30 is stepped as described hereinbefore. Thus, so long as a repetition of signals persists, the tape 30 will be stepped every other cycle, with a time delay (or nonstepping) cycle interposed automatically between each said stepping cycle.

In accordance with the present invention, facilities are also provided to prevent or block the operation of the plural armed control lever 79 in response to certain repeated character signals; for example, the so-called "blank" and "rub-out" signals which do not initiate cycles of operation which require a time delay factor to be interposed. To achieve this result, a blocking lever 116 is provided which is pivotally mounted on a shaft 117 appropriately supported in the frame of the apparatus. Lever 116 comprises a vertically directed arm 118 adapted at its extremity to cooperate with a shoulder 119 on the lever 79. Lever 116 is normally biased in a clockwise direction by a spring 121. Carried in swingle-tree fashion on shaft 122 journaled in horizontal arms 123 and 124 of lever 116 is a rockable bail member 125. Bail member 125 carries transversely of the bars 38 and 51 a pair of bail rods 126 and 127 which support rollers thereon adapted to cooperate with the bottom edges of said bars 38 and 51. The bail rods 126 and 127 are each presented opposite a transverse alignment of notches 128 corresponding in distribution to the particular signal for which repeated character delay is to be thus blocked out. Upon the selection of either of these bail rods, the selected bail rod 126 or 127 (with its rollers) is received within its associated transverse alignment of notches 128. When this occurs, the vertical arm 118 of lever 116 is presented in blocking relation with shoulder 119 so that if the same signal be repeated, the failure of movement of any of the connector bars 38 and 51 does not result in the selection of lever 79 by reason of the intervention of lever 116. Thus, while lever 79 is made responsive to repeated character signals generally, the means 116 and 125 illustrate one mode of excepting certain signals from the class to be served by the selection of lever 79.

Another mode of excepting certain signals is shown in Figs. 2 and 3, wherein more than two signals may be excepted. Cooperating with the shoulder 119 of lever 79 is the arm 130 of a bell crank lever 131, instead of the lever 116. The horizontal arm 132 of lever 131 cooperates with a stud 133 on a plate 134 which is vertically slidable on studs 135 mounted on side plate 136 of the frame of the apparatus. Extending through the plate 134 and transversely across the links 38 are a plurality of bail rods 137. Although three such rods 137 are shown, it is understood that the invention need not be so limited. Rods 137 are provided with rollers 139 which ride on the lower edges of links 38. Each rod 137 is pivotally articulated to the flange 141 of the bracket 142 which is secured to the side plate 136. A spring 143 individual to each rod 137 tends to bias its associated rod into contact with links 38. However, each spring 143 is stronger than the spring 140 which biases bell crank lever 131 counterclockwise, to minimize the resistance to the selective operation of rods 137, and still permit arm 132 of lever 131 to ride on stud 133.

Upon the selection of any one of the bail rods 137, the selected bail rod 137 (with its rollers) is received within its associated transverse alignment of notches 144. When this occurs, the plate 134 is raised, being guided by the studs 135. The stud 133 thereupon coacts with arm 132 of bell crank 131 to swing the arm 130 into the path of shoulder 119 of lever 79, thereby preventing the operation of lever 79.

With the arrangements according to the present invention, it is observed that the lever 79 is effective in response to a general class of repeated code signals to automatically interpose a time delay factor or cycle, while in response to certain other repeated signals the operation of lever 79 is prevented.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a tape controlled selector mechanism, means for sensing code indicia in a tape, transfer means, a plurality of settable members set by said transfer means according to the operation of said tape sensing means, a special settable member, cyclically operable cam means, cam follower means comprising a blockable portion and a setting portion, means effective under certain operating conditions to cooperate with said blockable portion to block said cam follower means, cam means carried by said plurality of of settable members to normally control said blocking means, and yieldable cam means pivotally carried by said special settable member in a manner to be yieldable only upon one direction of movement of said special settable member, said yieldable cam means effective in the other direction of movement of said special settable member to operate said blocking means to block said cam follower means to prevent the premature reoperation of said special settable member by said setting portion, whereby the setting of said special settable member in one manner by said cam follower means is facilitated by said blocking means, and in the reverse manner by said transfer means under the control of said blocking means.

2. In a tape controlled selector mechanism, means for sensing code indicia in a tape, transfer means, a plurality of settable members set by said transfer means according to the operation of said tape sensing means, a special settable member, cyclically operable cam means, cam follower means comprising a blockable portion and a setting portion, a special element controlled by said cam follower means, means effective under certain operating conditions to cooperate with said blockable portion to block said cam follower means, cam means carried by said plurality of settable members to normally control said blocking means, and yieldable cam means pivotally carried by said special settable member in a manner to be yieldable only upon one direction of movement of said special settable member, said yieldable cam means effective in the other direction of movement of said special settable member to operate said blocking means to block said cam follower means to prevent the premature reoperation of said special settable member by said setting portion, whereby the setting of said special settable member in one manner by said cam follower means is facilitated by said blocking means, and in the reverse manner by the coaction of said special element and said transfer means under the control of said blocking means.

3. In a tape controlled selector mechanism, means for sensing code indicia in a tape, transfer means, a plurality of settable members set by said transfer means according to the operation of said tape sensing means, a special settable member, cyclically operable cam means, cam follower means comprising a blockable portion and a setting portion, means effective under certain operating conditions to cooperate with said blockable portion to block said cam follower means, cam means carried by said plurality of settable members to normally control said blocking means, and yieldable cam means pivotally carried by said special settable member in a manner to be yieldable only upon one direction of movement of said special settable member, said yieldable cam means effective in the other direction of movement of said special settable member to operate said blocking means to block said cam follower means to prevent the premature reoperation of said special settable member by said setting portion, whereby the setting of said special settable member in one manner by said cam follower means is facilitated by said blocking means in response to consecutive occurrences of similar code indicia in the tape, and in the reverse manner by said transfer means in response to the resumption of normal occurrences of variant code indicia in said tape.

4. In a tape controlled selector mechanism, means for sensing code indicia in a tape, transfer means, a plurality of settable members set by said transfer means according to the operation of said tape sensing means, a special settable member, cyclically operable cam means, cam follower means comprising a blockable portion and a setting portion, a special element controlled by said cam follower means, means effective under certain operating conditions to cooperate with said blockable portion to block said cam follower means, cam means carried by said plurality of settable members to normally control said blocking means, and yieldable cam means pivotally carried by said special settable member in a manner to be yieldable only upon one direction of movement of said special settable member to operate said blocking means to block said cam follower means to prevent the premature reoperation of said special settable member by said setting portion, whereby the setting of said special settable member in one manner by said cam follower means is facilitated by said blocking means in response to consecutive occurrences of similar code indicia in the tape, and in the reverse manner by the coaction of said special element and said transfer means in response to the resumption of normal occurrences of variant code indicia in said tape.

5. In combination, tape sensing means, transfer means, a plurality of settable members set by said transfer means according to the operation of said tape sensing means, cam means, cam follower means comprising a blockable portion and a setting portion, a special settable member controlled by said setting portion, blocking means cooperable with said blockable portion under certain predetermined operating conditions to prevent control of said special settable member by said cam follower means, spring means associated with said cam follower means for rendering said setting portion effective to move said special settable member during the unblocked condition of said cam follower means, and means associated with said plurality of settable members for controlling the effectiveness of said blocking means.

6. In combination, tape controlled means, transfer means, a plurality of settable members set by said transfer means according to the operation of said tape controlled means, operating means, means cooperating with said operating means, said cooperating means comprising a blockable portion and a setting portion, a special settable member controlled by said setting portion, blocking means cooperable with said blockable portion under certain predetermined operating conditions to prevent control of said special settable member by said cooperating means, spring means associated with said cam follower means for rendering said setting portion effective to move said special settable member during the unblocked condition of said cam follower means, and means associated with said plurality of settable members for controlling the effectiveness of said blocking means.

7. In combination, tape controlled means, a plurality of settable members set according to the operation of said tape controlled means, operating means, means cooperating with said operating means, said cooperating means comprising a blockable portion and a setting portion, a special settable member controlled by said setting portion, blocking means cooperable with said blockable portion under certain predetermined operating conditions to prevent control of said special settable member by said cooperating means, spring means associated with said cam follower means for rendering said setting portion effective to move said special settable member during the unblocked condition of said cam follower means, and means associated with said plurality of settable members for controlling the effectiveness of said blocking means.

8. In a tape controlled selector mechanism, means for sensing code indicia in a tape, transfer means, a plurality of settable members set by said transfer means according to the operation of said tape sensing means, a special element associated with said tape sensing means, a special settable member, cyclically operable cam means, cam follower means, and control means controlled by said tape sensing means, said control means comprising cam projections on said settable members, a rocker member controlled by said projections, a blocking member cooperable jointly with said rocker member and said cam follower means, and spring means effective through said cam follower means following the non-operation of said blocking member by said rocker member under an inert condition of said plurality of settable members indicative of consecutive occurrences of similar code indicia in the tape, whereby said special settable member is enabled to be set in one manner solely by said unblocked cam follower means and to be set in a reverse manner by the coaction of said special element and said transfer means in response to the blocked condition of said cam follower means indicative of the resumption of normal occurrences of variant code indicia in the tape.

9. In combination, tape sensing means, transfer means, a plurality of settable members set by said transfer means according to the operation of said tape sensing means, a special bar associated with said tape sensing means, a special settable member, cam means, cam follower means comprising a blocking portion and a setting portion, blocking means comprising a rocker member and a rocker member actuator for limiting the operation of said cam follower means, camming means on said settable members for controlling the effectiveness of said rocker member actuator, and spring means effective through said cam follower means following the non-operation of said rocker member by said rocker member actuator in response to an inert condition of said settable bars to enable through the instrumentality of said setting portion the effectuation of the operation of said cam follower means upon said special settable member in one manner and to subsequently render in response to another condition of said settable bars, said transfer means effective under the control of said special bar to operate said special settable member in the reverse manner.

10. In a tape controlled selector mechanism, means for sensing code indicia in a tape, transfer means, a plurality of settable members set by said transfer means according to the operation of said tape sensing means, a special element associated with said tape sensing means, a special settable member, cyclically operable cam means, cam follower means, control means controlled by said tape sensing means, said control means comprising cam projections on said settable members, a rocker member controlled by said projections, and a blocking member cooperable jointly with said rocker member and said cam follower means, spring means effective through said cam follower means following the non-operation of said blocking member by said rocker member under an inert condition of said plurality of settable members indicative of consecutive occurrences of similar code indicia in the tape, whereby said special settable member is enabled to be set in one manner solely by said unblocked cam follower means and to be set in a reverse manner by the coaction of said special element and said transfer means in response to the blocked condition of said cam follower means indicative of the resumption of normal occurrences of variant code indicia in said tape, and means controlled by said special settable member to preclude the operation of said tape sensing means.

11. In a tape controlled selector mechanism, cyclically operable means for sensing code indicia in a tape, transfer means, a plurality of settable members set by said transfer means according to the operation of said tape sensing means, a special element associated with said tape sensing means, a special settable member, cyclically operable cam means, cam follower means, control means controlled by said tape sensing means, said control means comprising cam projections on said settable members, a rocker member controlled by said projections, and a blocking member cooperable jointly with said rocker member and said cam follower means, spring means effective through said cam follower means following the non-operation of said blocking member by said rocker member under an inert condition of said plurality of settable members indicative of consecutive occurrences of similar code indicia in the tape, whereby said special settable member is enabled to be set in one manner solely by said unblocked cam follower means and to be set in a reverse manner by the coaction of said special element and said transfer means in response to the blocked condition of said cam follower means indicative of the resumption of normal occurrences of variant code indicia in the tape.

CARL W. SWAN.

References Cited in the file of this patent

UNITED STATES PATENTS

| Number | Name | Date |
|---|---|---|
| 2,104,030 | Goetz | Jan. 4, 1938 |
| 2,152,641 | Goetz | Apr. 4, 1939 |